Patented June 15, 1943

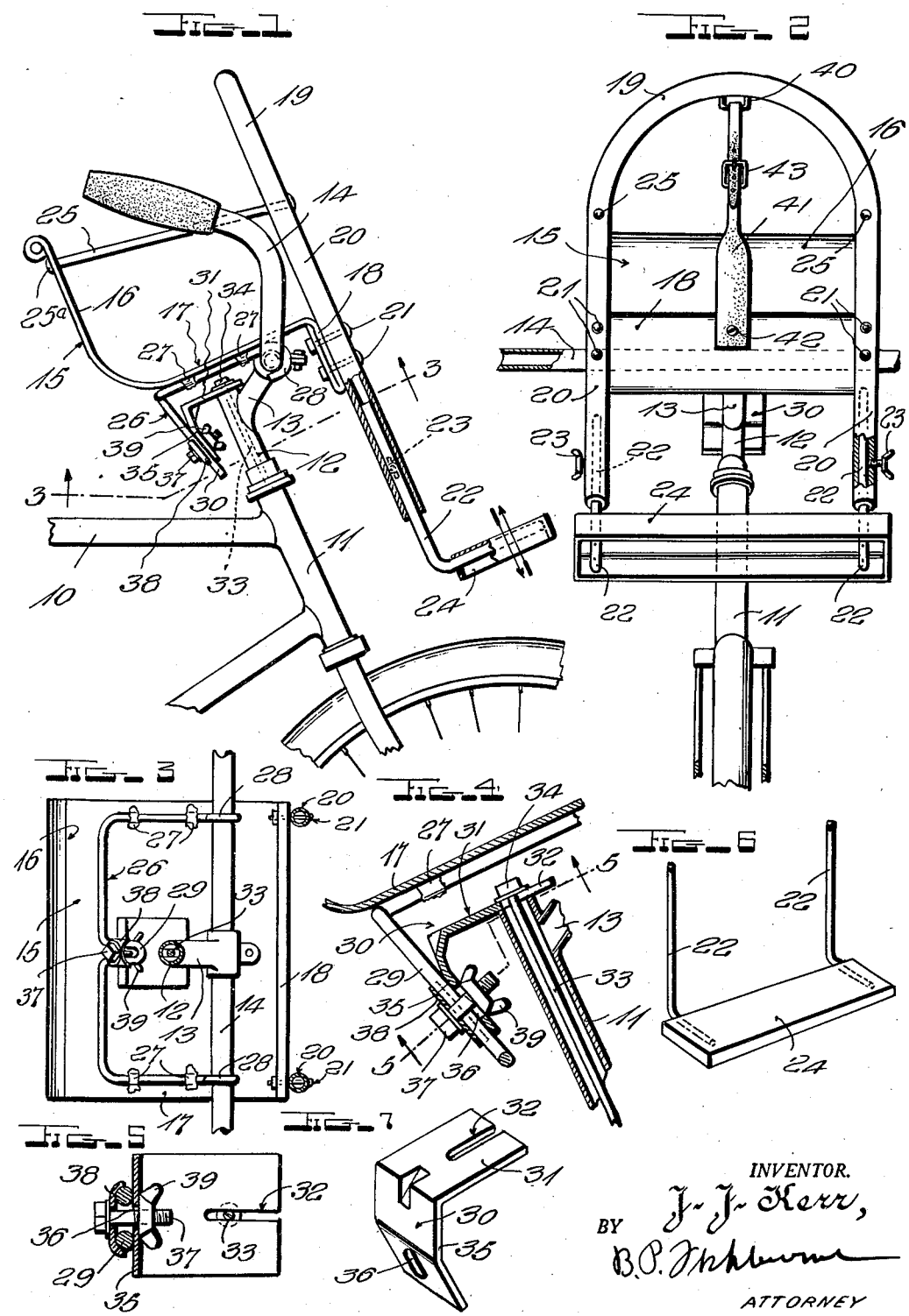

2,321,752

UNITED STATES PATENT OFFICE 2,321,752

BICYCLE HANDLE-BAR SEAT

Joseph J. Kerr, Dillon, S. C.

Application August 27, 1941, Serial No. 408,513

7 Claims. (Cl. 155—5.13)

My invention relates to a bicycle seat.

An important object of the invention is to provide means for securely mounting the seat upon the handlebar of the bicycle.

A further object of the invention is to provide a seat of the above-mentioned character adapted for holding a child in a comfortable and secure manner.

A further object of the invention is to provide a device of the above-mentioned character which is adjustable for accommodating children of different sizes.

A further object of the invention is to provide a device of the above-mentioned character so constructed that the child may readily hold itself upon or within the seat.

A further object of the invention is to provide a device of the above-mentioned character which is simple in construction, and cheap to manufacture.

Other objects and advantages of the invention will be apparent during the course of the following description.

In the accompanying drawing forming a part of this application and in which like numerals are employed to designate like parts throughout the same, Figure 1 is a side elevation of a seat device embodying my invention, parts in vertical section, with the device shown applied to the handlebar of a bicycle, Figure 2 is a front elevation of the same, Figure 3 is a substantially horizontal section taken on line 3—3 of Figure 1, Figure 4 is a detailed section through the attaching bracket and associated elements, Figure 5 is a generally horizontal section taken on line 5—5 of Figure 4, Figure 6 is a perspective view of the foot rest, and, Figure 7 is a perspective view of the attaching bracket.

In the drawing, wherein for the purpose of illustration is shown a preferred embodiment of my invention, the numeral 10 designates the frame of a bicycle, having the usual head 11, carrying the tubular steering column 12, provided with a forward lateral extension 13, upon which the handlebar 14 is mounted, as is well known.

The seat device comprises a body portion 15, preferably formed of sheet metal, and bent to form a back 16 and a seat 17. At its forward end, the material of the seat is bent downwardly at substantially a right angle to the seat and then back upon itself for affording a stiff attaching strip or flange 18, including two layers.

The numeral 19 designates an inverted U-shaped handlebar, the upper closed end of which extends above the seat 17 and back 16 and the substantially vertical legs 20 of the handlebar are arranged forwardly of and adjacent to the flange 18 and are attached thereto by bolts 21 or the like. The vertical legs extend downwardly below the seat 17 for a substantial distance, as shown. The vertical legs 20 are tubular and receive rods 22, adjustably mounted within the tubular legs 20 and clamped therein in selected adjusted positions by set screws 23. The rods 22 carry a foot rest 24, rigidly secured thereto. The foot rest is generally parallel with the seat 17 and both the seat and foot rest are preferably inclined and extend upwardly in a forward direction, while the inverted generally U-shaped handlebar 19 is preferably vertically inclined and extends rearwardly in an upward direction and is substantially parallel with the head 11.

The legs 20 of the inverted U-shaped handlebar are connected with side rods 25, and these side rods are attached to the back 16, as shown at 25a. The side rods 25 serve to rigidly connect the upper portion of the back 16 with the legs 20.

Arranged beneath the seat 17 is a generally U-shaped attaching element 26, rigidly secured to the seat by soldering or welding, as shown at 27. This U-shaped attaching element is in the form of a rod, and includes a rear closed end and sides which face forwardly and have their forward ends bent to provide hooks 28, which face downwardly and rearwardly, and are disposed to engage over the handlebar 14, upon opposite sides of the steering post 12. The generally U-shaped attaching element 26 being disposed beneath the seat and secured thereto is generally horizontally arranged. The closed end of the U-shaped attaching member is provided with a U-shaped loop 29, as shown. The numeral 30 designates a generally inverted L-shaped attaching bracket, having an upper generally horizontal portion 31 provided with a slot 32, extending through its forward end. This slot receives the usual coupling rod 33 arranged within the head 11 and it is provided with a head 34, rigidly secured thereto. By turning the rod 33 through the medium of the head 34, this rod may be slightly unscrewed, whereby the upper generally horizontal portion 31 of the bracket may be applied to the upper end of the head 11 and beneath the head 34, subsequently to which the coupling rod 33 is again screwed up and the head 34 will clamp the generally horizontal portion 31 to the head 11. The bracket 30 includes a depending generally vertical portion 35, provided with an elongated slot 36, near its lower end, to receive a bolt 37, passing through the opening of the loop 29. This bolt carries a washer 38 and a winged-nut 39.

The inverted U-shaped handlebar 19 may be equipped with a loop or staple 40, rigidly attached thereto, engaged by an adjustable strap 41, the lower end of which is attached to the strip or flange 18, as shown at 42. The free end of the strap is passed through the loop 40 and this free end is passed through a buckle 43, secured to the strap, between its ends. The strap may be detached from the loop 40, when desired.

When the hooks 28 are applied to the handlebar 14 and the attaching bracket 30 is clamped to the head 11, before the winged-nut 39 is screwed up, the body portion 15 may be angularly adjusted and held in the selected adjusted position by screwing up the winged-nut 39 whereby the loop 29 is clamped to the depending portion 35. The elevation of the foot rest 24 is regulated to suit the size of the child, after which the rods 22 are clamped to the legs 20. The child is placed upon or within the body portion 15 and is seated upon the seat 17 and its legs pass through the inverted U-shaped handlebar 19 and its feet rest upon the foot rest 24. The side bars 25 prevent the body of the child from moving off of the seat 17 while the inverted U-shaped handlebar prevents the forward displacement of the child and also provides means whereby the child may securely hold itself in place upon the seat.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. A seat device, comprising a body portion including a connected back and seat, an inverted substantially U-shaped handlebar secured to the seat adjacent to its forward end and extending above and below the seat, side elements connected with the back and the handlebar, a foot rest carried by the lower ends of the handlebar, and means to secure the body portion upon the handlebar of a bicycle.

2. A seat device, comprising a body portion including a connected back and seat, said seat having its material at its forward end bent downwardly to provide an attaching flange, an inverted U-shaped handlebar arranged in advance of the attaching flange and including upstanding legs, means to secure the legs to the attaching flange, a foot rest carried by the lower ends of the legs, side rods secured to the back and secured to the legs above the seat, and means to secure the body portion to the handlebars of a bicycle.

3. A seat device, comprising a seat, an inverted substantially U-shaped handlebar including upstanding spaced tubular legs, means to secure the tubular legs to the seat, a foot rest, rods carrying the foot rest and adjustably mounted in the lower ends of the tubular legs, means to clamp the rods in the selected adjusted position to the tubular legs, and means to secure the body portion to the handlebar of a bicycle.

4. A seat device to be mounted upon a bicycle having a handlebar and steering column, said seat device comprising a seat, a generally horizontal generally U-shaped attaching element arranged beneath the seat and secured thereto, said attaching element including a rear closed end and forwardly facing arms provided near their forward ends with devices for holding engagement with the handlebar, a depending element spaced from the holding devices and carried by the rear closed end of the attaching element, a bracket secured to the steering column, and adjustable means for securing the bracket to the depending element.

5. A seat device to be mounted upon a bicycle having a steering column and a clamping element at the upper end of the steering column and a lateral extension secured to the steering column and projecting forwardly beyond the same and a handlebar carried by the lateral extension in advance of the steering column, said seat device comprising a seat, a generally horizontal generally U-shaped attaching element arranged beneath the seat and secured thereto, said attaching element including a rear closed end and forwardly facing arms provided near their forward ends with devices for holding engagement with the handlebar, a depending element spaced from the holding devices and carried by the rear closed end of the attaching element, a bracket including a generally horizontal arm and a generally vertical arm, the generally horizontal arm having a slot to receive the clamping element of the steering column, and means to vertically adjustably secure the generally vertical arm to the depending element.

6. A seat device to be secured to the handlebar of a bicycle, said seat device comprising a connected back and seat, upstanding arms secured to the seat adjacent to its forward end and extending above and below the seat for substantial distances, side elements connected with the upstanding arms and the back, a foot rest carried by the lower ends of the upstanding arms, and means to secure the seat and back to the handlebars.

7. A seat device comprising a body portion including a connected back and seat, said seat having a substantially long front transverse edge, an inverted substantially U-shaped handlebar secured to the seat adjacent to the ends of the transverse front edge, the inverted substantially U-shaped handlebar including generally parallel sides projecting above and below the seat and spaced sufficiently to permit of the passage of the legs of the occupant between such sides, a foot rest carried by the lower ends of the sides, and means other than the inverted substantially U-shaped handlebar to secure the body portion to the handlebar of a bicycle.

JOSEPH J. KERR.